United States Patent

Dotter

[11] Patent Number: 4,473,088
[45] Date of Patent: Sep. 25, 1984

[54] PRESSURE REGULATOR FAUCET SLIDE VALVE

[76] Inventor: John H. Dotter, 810 Ocean Monarch, 133 N. Pompano Beach Blvd., Pompano Beach, Fla. 33062

[21] Appl. No.: 267,809

[22] Filed: May 28, 1981

[51] Int. Cl.$^3$ ............................................. G05D 11/03
[52] U.S. Cl. ..................................... 137/98; 137/111; 137/114; 137/614.17; 137/636.4; 251/172; 251/186
[58] Field of Search ............. 137/98, 100, 111, 114, 137/614.17, 636.4

[56] References Cited

U.S. PATENT DOCUMENTS

| | | | |
|---|---|---|---|
| 2,308,127 | 1/1943 | Symmons | 137/100 X |
| 2,308,408 | 1/1943 | Wall | 137/111 |
| 3,105,519 | 10/1963 | Fraser | 137/636.4 X |
| 3,828,821 | 8/1974 | Dotter | 137/636.4 |
| 4,033,370 | 7/1977 | Egli | 137/100 |

Primary Examiner—Robert G. Nilson
Attorney, Agent, or Firm—Carothers & Carothers

[57] ABSTRACT

A hot and cold water pressure regulating mixing faucet with automatic hot water shut-off in the event of cold water failure. The faucet maintains a predetermined discharge pressure less than the supply pressure regardless of the amount of water issuing from the faucet in combination with parts in a flat face slide valve surface to regulate the amount of water issuing from the faucet or the proportionate mixture of different or hot and cold water, and in combination with a concentric rotary proportioning selector valve having an axial bore containing the pressure regulator valve operable axially within the bore of the rotary selector valve. The pressure regulator valve is operable to completely shut off the hot water in the event of cold water failure. The slide valve and the rotary proportioning valve and the pressure regulating valve are coaxially concentric to each other cooperating in performing their valvular function upon the water entering the housing and discharging axially. In one form, the pressure regulator valve is also operable to partially close off the hot water inlet with a decrease in cold water pressure in order to maintain the desired mixing temperature during variations of cold water pressure.

9 Claims, 5 Drawing Figures

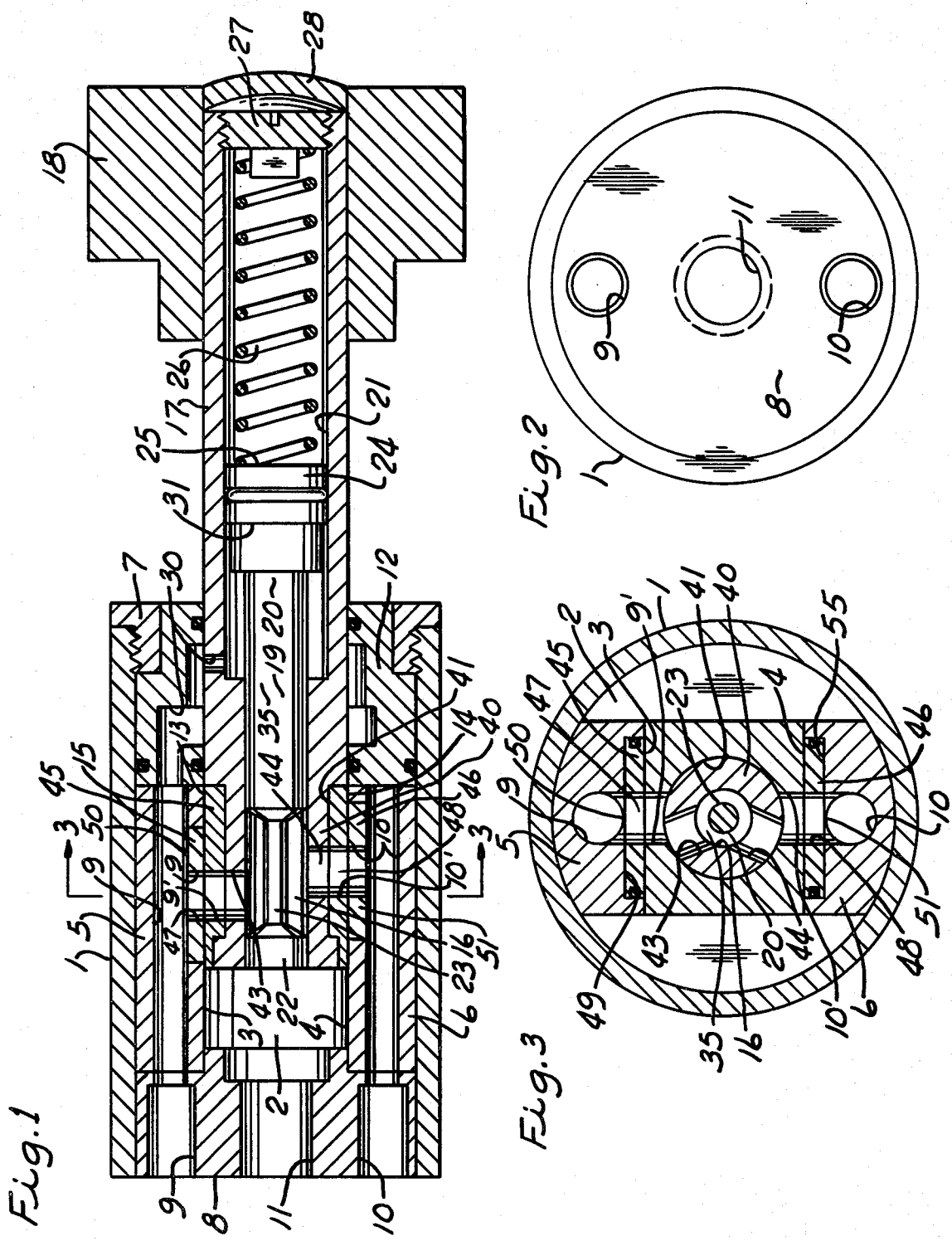

PRESSURE REGULATOR FAUCET SLIDE VALVE

BACKGROUND OF THE INVENTION

The present invention relates generally to valves and more particularly to pressure regulating faucet slide valves.

The present invention relates to improvements in my pressure regulator faucet slide valve disclosed in U.S. Pat. No. 3,828,821 and issued on Aug. 13, 1974. This prior art pressure regulator faucet slide valve does not provide means to shut off hot water in the event of cold water failure, nor does it provide means to maintain the mixing temperature during variations of cold water pressure.

SUMMARY OF THE INVENTION

This invention provides a pressure regulating slide valve with automatic hot water shut-off in the event of cold water failure. The valve is a single knob stem-actuated fluid slide valve operable in a valve chamber enclosed in a housing. The hot and cold water inlet ports within the valve housing are disposed normally to a valve chamber flat wall surface and cooperate with cooperating ports in a mating flat wall surface of a slide valve operable by a stem extending from the slide valve through one end of the valve housing. A bore is provided within the slide valve and connects to the inlet ports in the slide valve. The inlet ports in the slide valve are cooperatively positioned to selectively have full registration with the housing inlet ports to have fluids flow through the slide valve bore to a housing outlet port, the slide valve being axially slidable by its stem to offset the flat face inlet ports relative to each other to vary and interrupt fluid flow to the outlet port.

A pressure regulating valve is provided with a stem which extends from an externally accessible chamber in the slide valve operating stem into the aforesaid slide valve bore. A first head is provided on the pressure regulating valve stem intermediate the slide valve inlet port and the outlet port, and this head slidably fits the valve bore and is displaceable to open the slide valve bore to the outlet port to function as a pressure control valve surface. An abutment piston is further provided on the end of the pressure regulating valve stem slidably received in the aforesaid slide valve stem chamber, and pressures are effective on opposite sides of this abutment piston to regulate the pressure of the fluid passing between the aforesaid first head and the end of the slide valve bore to the outlet port.

An open passageway is provided from the cold water inlet port to the aforesaid stem chamber to subject the cold water pressure against one side of the aforesaid abutment piston to apply the aforesaid pressure on one side of the abutment piston. This pressure urges the first head of the pressure regulating valve towards its closed position in the slide valve bore in regulating the pressure of the mixed hot and cold water in the valve bore to discharge. A second head is also slidably received in the slide valve bore on the pressure regulating valve stem, and opposes the first-mentioned head on the regulating valve stem. This second head is adapted and positioned to close off the hot water inlet port to the valve bore when the cold water fluid pressure against the abutment piston attains a predetermined minimum, thereby permitting the pressure regulating valve stem to axially slide due to pressure on the opposing side of the abutment piston such that the aforesaid second head on the pressure regulating valve stem automatically shuts off the hot water inlet port to the slide valve bore in the event of cold water failure, thus preventing accidental burns to one's person, such as might be encountered in a shower.

As previously noted, the cold water pressure is effective on one side of the abutment piston of the pressure regulating valve stem. A spring is provided on the other or opposing side of the abutment piston and engages that side of the piston. Thus, the cold water pressure and the spring on opposing sides of the piston operate the water discharge pressure to the outlet port of the valve. In the event of cold water failure, this spring urges the pressure regulating valve stem to close off the hot water inlet port. Either this abutment piston or a stop against which the aforesaid spring rests, or both, is axially and externally adjustable in the accessible chamber of the slide valve stem to be effective to change the pressure applied by this spring against the opposing end of the abutment piston to thereby change the discharge fluid pressure. The valve of the present invention is unusually simple and inexpensive in construction, as the valve housing is preferably comprised of a simple tube member with a removable cap sealing the stem end and an end cap sealing the other end of the tube member thereby requiring a minimum of machining in manufacture. The outlet port and the inlet ports are also conveniently provided in and pass through this end cap. The end cap may be conveniently secured in the tube member of the valve housing with a force fit.

In a variation embodiment of the single knob stem-actuated fluid slide valve structure of the present invention, the hot water and cold water inlet ports in the slide valve are axially offset from each other in communication with and relative to the slide valve bore, with the hot water inlet port being positioned closer or closest to the second head or shut-off head on the pressure regulating valve stem, such that when the cold water pressure applied against one side of the abutment piston, as previously described, partially decreases, this second head of the pressure regulating stem will correspondingly partially close off the hot water inlet port in the slide valve bore. This maintains the temperature of the water exiting the outlet port at a constant temperature during variations of cold water pressure. In the event of complete cold water pressure failure, the second head of the pressure regulating valve stem will completely close off the hot water inlet port to the slide valve bore.

Yet another variation of the slide valve of the present invention includes a pressure sealing disc which has a central passage through the disc and this disc is received in a recess in the flat face on the wall of the valve chamber with the central passage of the disc communicating with a corresponding inlet port such that the fluid under pressure in this inlet port urges the disc into sliding seal engagement with the cooperative mating flat face on the slide valve to insure a good fluid seal during periods of valve shut-off.

In yet another variation, the portion of the slide valve which is slidably received in the slide valve chamber is axially divided into two free-floating halves with springs interposed between the halves to continually urge the slide valve flat face into mating seal engagement with the valve chamber flat face. This further insures a good seal during valve shut-off.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

FIG. 1 is a sectional view of a slide valve contructed in accordance with the teachings of the present invention.

FIG. 2 is an end view of the slide valve illustrated in FIG. 1.

FIG. 3 is a cross-sectional view of the slide valve of FIG. 1 as seen along section line 3—3.

DETAILED DESCRIPTION OF THE PREFERRED EMBODIMENTS

Figure 4:
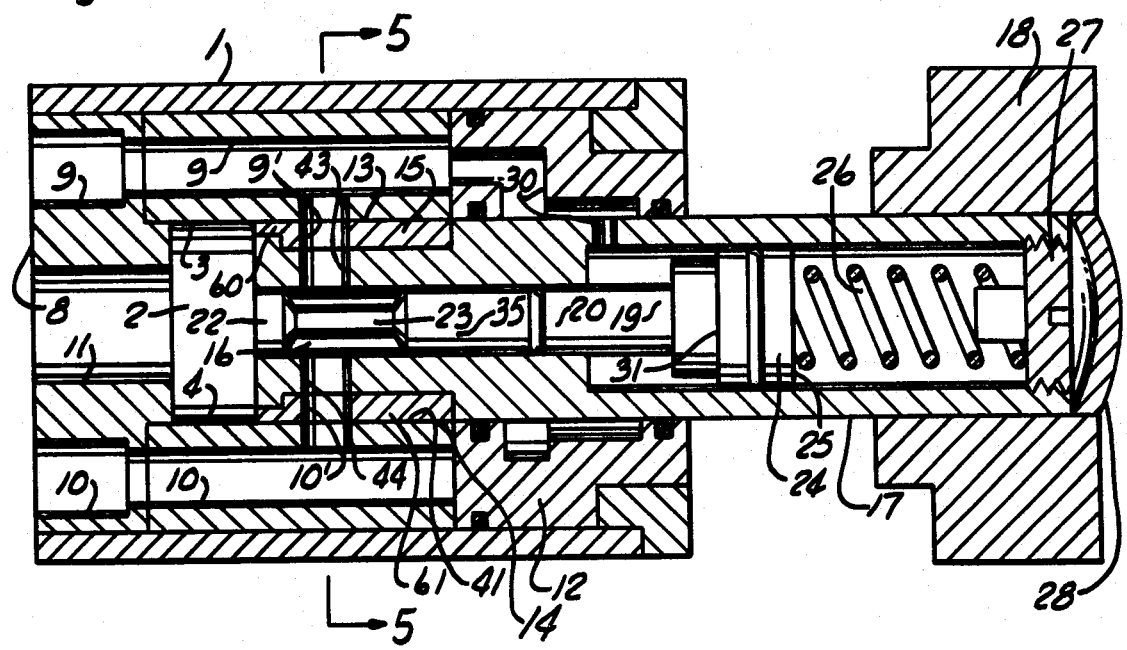
FIG. 4 is a sectional view of a slide valve constructed in accordance with the teachings of the present invention and which is similar in construction to the slide valve shown in FIG. 1 with modifications.

Referring to FIGS. 1, 2 and 3, the valve housing 1 has a valve chamber 2 with flat faces 3 and 4 along opposite sides thereof which are defined by inserts 5 and 6 respectively. The valve chamber 2 is enclosed in housing 1 with a removable cap 7 threadably received with and sealing the stem end and an end cap 8 sealing the other end of the tube member of housing 1. End cap 8 is secured with a force fit in the tube member of housing 1, such as through the use of a shrink fit by shrinking the end cap 8 with the application of cold temperatures and/or applying heat to the tubular member of housing 1.

A cold water housing inlet port 9 and a hot water inlet port 10 are provided in housing end cap 8 together with a water outlet port 11.

As previously described, valve chamber 2 is provided with flat faces 3 and 4 on the wall of the valve chamber. These flat faces are provided by inserts 5 and 6, which in turn, are retained within the housing 1 by force fit engagement with the inside of end cap 8 at one end and by abutment with pressure supply bushing 12. Flat face 3 of insert 5 contains cold water housing inlet port 9 and flat face 4 of insert 6 contains hot water housing inlet port 10. Respective cooperative mating flat faces 13 and 14 are provided on slide valve 15 in sealing slidable engagement respectively with the valve chamber flat faces 3 and 4. Inlet ports 9' and 10' in the flat faces 13 and 14 respectively of slide valve 15 communicate or connect to slide valve bore 16. These inlet ports 9' and 10' are cooperatively positioned to selectively have full registration with housing inlet ports 9 and 10 respectively to have fluid flow through the slide valve bore 16 to housing outlet port 11.

Slide valve 15 is axially slidable by stem 17 with knob 18 to offset inlet ports 9 and 9' and inlet ports 10 and 10' relative to each other to vary and interrupt the fluid flow to outlet port 11.

A pressure regulating valve 19 is provided with stem 20 which slidably extends from externally accessible chamber 21 in the slide valve operating valve stem 17 into the slide valve bore 16. A first head 22 is provided at the end of pressure regulating valve stem 20 at the end of the restricted portion 23 of stem 20. First head 22 is positioned intermediate slide valve inlet ports 9' and 10' and the outlet port 11. First head 22 slidably fits valve bore 16 and is displaceable to the left as viewed in FIG. 1 to open slide valve bore 16 to outlet port 11 to function as a pressure control valve surface in a fashion described in conjunction with FIG. 12 of my afore-mentioned U.S. Pat. No. 3,828,821.

Abutment piston 24 is secured on the opposite end of pressure regulating valve stem 20 and is slidably received in slide valve stem chamber 21. Pressures are effective on the opposite sides of this abutment piston 24 to regulate the pressure of the fluid passing between first head 22 and the end of slide valve bore 16 to outlet port 11. On one opposing end 25 of piston 24, this pressure is provided by spring 26 under compression which engages the opposing end 25 of piston 24 at one end and engages adjustable stop 27 at its other end. Adjustable stop 27 is threadably received in chamber 21 as indicated so that its depth of penetration into chamber 21 may be varied in order to change the effective spring pressure of spring 26 applied against end 25 of piston 24. Access to adjustable abutment 27 is readily possible by snap-out removal of end cover 28. Abutment piston 24 may also be adjustably positioned on the end of stem 20 to axially change its position on the stem.

Open passageways 30 from cold water inlet port 9 communicate to stem chamber 21 to subject water or fluid pressure against side 31 of abutment piston 24 to apply the aforesaid pressure on side 31 of abutment piston 24 to urge first head 22 toward its closed position in slide valve bore 16, as indicated in FIG. 1, in regulating pressure of the fluid to discharge. Thus, by regulating the pressure applied by spring 26 against end 25 of piston 24, one can adjust the fluid pressure exiting outlet port 11. The action of the cold water pressure on side 31 of piston 24 in combination with the action of pressure applied by spring 26 on the side 25 of piston 24 maintains a constant water pressure at outlet port 11, even though water inlet pressures to inlet ports 9 and 10 may vary.

A second head 35 is provided on and is part of pressure regulating valve stem 20 and is slidably received in valve bore 16 and opposes first head 22. This second head 35 is adapted and positioned to close off the hot water inlet port 10' in slide valve bore 16 when the cold water pressure against side 31 of abutment piston 34 attains a predetermined minimum or ceases, thereby permitting the pressure regulating valve stem 20 to axially slide due to pressure applied by spring 26, which is now unopposed by cold water pressure on the opposite side of piston 24. Thus, in the event of cold water failure, the hot water inlet is automatically shut off, and no hot water will exit outlet port 11, which might otherwise scald or burn an individual.

The slide valve 13 also includes a rotatable selector valve 40 axially secured in, and rotatably received in a second bore 41 in slide valve 13. This rotatable selector valve 40 is rotatable with slide valve stem 17, for rotation relative to slide valve 13. The first-mentioned valve bore 16 is thus provided within this selector valve 40.

The portions 43 and 44 of inlet ports 9' and 10' in rotary selector valve 40 which communicate with valve bore 16, are selectively mateable with their respective inlet ports 9' and 10' in slide valve 15 in varying degrees, depending upon the degree of rotation of selector valve 40 in bore 41 to permit mixing of the hot and cold water in bore 16 of selected fluid quantities of each respective inlet port 9' and 10' in the slide valve. This is best illustrated in FIG. 3, where it may be seen that inlet port portions 43 and 44 are radially offset from each other as indicated to provide selectable mixing of the hot and cold water within bore 23 in order to provide the desired water temperature at outlet port 11.

With particular reference to FIG. 1, this embodiment illustrates inlet ports 9' and 10' in slide valve 13 together with their respective mateable inlet ports 9 and 10 in inserts 5 and 6, as being axially offset from each other in communication with and relative to slide valve bore 16. In addition, hot water inlet port 10', which does not connect to passageways 30, is positioned closest to second head 35 of pressure regulating valve stem 20, such that when cold water fluid pressure applied against side or end 31 of piston 24 partially decreases, the urging of spring 26 will cause second head 35 to correspondingly partially close off hot water inlet port 10' in slide valve bore 16. This has the effect of maintaining the temperature of the water exiting outlet port 11 constant, even though there may be variations of cold water pressure. In the event of complete cold water failure, however, head 35 will completely close off hot water inlet port 10'.

With particular reference to FIGS. 1 and 2, pressure sealing discs 45 and 46 which have central passages 47 and 48 passing therethrough and providing a portion of inlet ports 9 and 10 respectively, are received respectively in recesses 49 and 55 of flat faces 3 and 4 respectively of inserts 5 and 6. A surface portion 50 and 51 of sealing discs 45 and 46 are respectively exposed to or communicate with respective inlet ports 9 and 10 such that the fluid under pressure in these inlet ports continually urge the sealing discs into sliding seal engagement with the cooperative mating flat faces 13 and 14 on slide valve 15. This insures a good slide valve shut-off seal, in spite of long wear associated with extended use of the valve. These sealing discs 45 and 46 are preferably made of a good seal material, such as ceramic or nitride-bonded silicon carbide.

Regarding the materials utilized in other portions of the valve, they may be any suitable material such as bronze, stainless steel, or suitable plastics.

Figure 5:
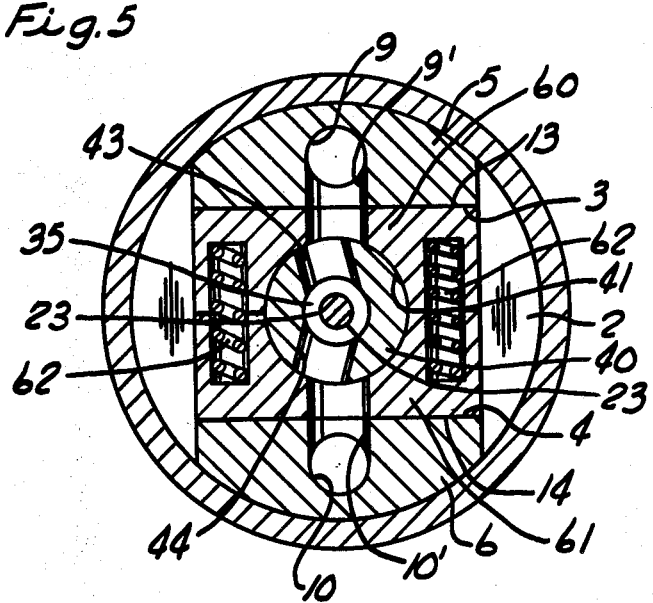
FIG. 5 is a cross-sectional view of the slide valve illustrated in FIG. 4 as seen along section line 5—5.

Referring next to the slide valve embodiment of the present invention illustrated in FIGS. 4 and 5, this embodiment operates in all respects in the identical manner as the slide valve described with respect to FIGS. 1, 2 and 3, with the exception that the inlet ports 9' and 10' are not offset as illustrated previously. Thus, the valve of FIGS. 4 and 5 does not have capabilites of maintaining a constant water temperature at outlet port 11 during variations of cold water pressure inlet. In view of the fact that the valve of this embodiment operates in the same manner, identical and similar parts are designated with the same reference numerals.

In the slide valve structure illustrated in FIGS. 4 and 5, the portion 15 of the slide valve which is slidably received in slide valve chamber 2 is axially divided into two free-floating halves 60 and 61 respectively. These two halves have springs 62 interposed between them to continually urge the respective slide valve flat faces 13 and 14 of halves 60 and 61 into mating seal engagement with the slide valve chamber flat faces 3 and 4 to continually insure a good slide valve shut-off seal, even after long use. In this embodiment, the split portion 15 of the slide valve may be made of a good wearing seal material, such as stainless steel, ceramic, nitride-bonded silicon carbide, or a suitable plastic.

Except for the offset inlet ports and the absence of sealing discs such as those illustrated at 45 and 46 in FIG. 1, this valve embodiment operates in the same manner. Due to the feature of having the split slide valve made of halves 60 and 61, these discs as described in connection with the embodiment of FIGS. 1, 2 and 3 are not required in the embodiment illustrated in FIGS. 4 and 5.

I claim:

1. A single knob stem-actuated fluid slide valve operable in a valve chamber enclosed in a housing with a removable cap sealing the stem end and with outlet port means and at least two housing inlet port means at its other end, a bore in said slide valve, at least one flat face means on the wall of said valve chamber within said housing, said flat face means containing said housing inlet port means, a cooperative mating flat face means on said slide valve in sealing slidable engagement with said valve chamber flat face means, inlet port means in said slide valve flat face means connected to said slide valve bore and cooperating to selectively have full registration with said housing inlet port means to have fluid flow through said slide valve bore to said housing outlet port means, said slide valve being axially slidable by said stem to offset said flat face inlet port means relative to each other to vary and interrupt the fluid flow to said outlet port means, a pressure regulating valve having a stem slidably extending from an externally accessible chamber in said slide valve operating stem into said slide valve bore, a first head on said pressure regulating valve stem intermediate said slide valve inlet port means and said outlet port means and slidably fitting said valve bore and displaceable to open said slide valve bore to said outlet port means to function as a pressure control valve surface, an abutment piston on the end of said pressure regulating valve stem slidably received in said slide valve stem chamber, pressure means effective on the opposite sides of said abutment piston to regulate the pressure of the fluid passing between said first head and the end of said slide valve bore to said outlet port means, open passageways from one valve inlet port means to said stem chamber to subject fluid pressure against one side of said abutment piston to apply said pressure means on one side of said abutment piston to urge said first head toward its closed position in said slide valve bore in regulating the pressure of the fluid to discharge, the improvement comprising a second head slidably received in said slide valve bore on said pressure regulating valve stem and opposing said first head on said regulating valve stem, said second head adapted and positioned to close off said inlet port means in said slide valve bore when the fluid pressure against said one side of said abutment piston attains a predetermined minimum, thereby permitting said pressure regulating valve stem to axially slide from said pressure means on the opposing of said one side of said abutment piston.

2. The single knob stem-actuated fluid slide valve structure of claim 1, wherein said pressure means effective on said opposing side of said abutment piston is a spring engaging between said opposing side and stop means in said valve stem chamber.

3. The single knob stem-actuated fluid slide valve structure of claim 2, wherein at least one of said abutment piston and stop means is axially and externally adjustable in said accessible chamber to be effective to change the pressure applied by said spring against said opposing end of said abutment piston to thereby change the discharge fluid pressure.

4. The single knob stem-actuated fluid slide valve structure of claim 1, said slide valve including rotatable selector valve means axially secured in and rotatably received in a second bore in said slide valve and rotatable with said slide valve stem for rotation relative to said slide valve, the first said valve bore being provided in said selector valve, additional inlet port means in said rotary selector valve communicating with the first said valve bore and selectively mateable with their respective inlet port means in said slide valve in varying degrees depending upon the degree of rotation of said selector valve in said slide valve second bore to permit mixing in the first said bore of selected fluid quantities from each respective inlet port means in said slide valve.

5. The single knob stem-actuated fluid slide valve structure of claim 1, wherein said valve housing is comprised of a tube member with said removable cap sealing the stem end and an end cap sealing the other end of said tube member, said outlet port means and said inlet port means passing through said end cap.

6. The single knob stem-actuated fluid slide valve structure of claim 5, wherein said end cap is secured with a force fit in said tube member.

7. The single knob stem-actuated fluid slide valve structure of claim 1, wherein said inlet port means in said slide valve consists of two inlet ports which are axially offset from each other in communication with and relative to said slide valve bore with the inlet port which does not connect to said passageways being positioned closest to said second head on said pressure regulating valve stem such that when the fluid pressure against said one side of said abutment piston partially decreases, said second head correspondingly partially closes off said closest inlet port in said slide valve bore.

8. The single knob stem-actuated fluid slide valve structure of claim 1, including a pressure sealing disc having a central passage therethrough and received in a recess in said flat face means on the wall of said valve chamber with said central passage communicating with one of said inlet port means such that fluid under pressure in said one inlet port urges said disc into sliding seal engagement with said cooperative mating flat face means on said slide valve.

9. The single knob stem-actuated fluid slide valve structure of claim 1, wherein the portion of said slide valve which is slidably received in said slide valve chamber is axially divided into two free-floating halves with spring means interposed between said halves to continually urge said slide valve flat face means into mating seal engagement with said valve chamber flat face means.

* * * * *